United States Patent [19]

Ishiguro et al.

[11] Patent Number: 5,164,271
[45] Date of Patent: Nov. 17, 1992

[54] OVERLAID STAINLESS CLAD STEELS WITH IMPROVED RESISTANCE TO HYDROGEN INDUCED DISBONDING

[75] Inventors: Tohru Ishiguro, Hokkaido; Junji Itagaki, Tokyo, both of Japan

[73] Assignee: The Japan Steel Works Ltd., Tokyo, Japan

[21] Appl. No.: 760,033

[22] Filed: Sep. 13, 1991

[51] Int. Cl.$^5$ .............................................. B32B 15/18
[52] U.S. Cl. .................... 428/683; 428/685; 428/939
[58] Field of Search ................. 428/683, 685, 939; 148/529; 220/586, 456

[56] References Cited

U.S. PATENT DOCUMENTS

| | | | |
|---|---|---|---|
| 2,874,082 | 2/1959 | Lena et al. | 428/683 |
| 3,719,790 | 3/1973 | Plöckinger et al. | 428/683 |
| 4,058,650 | 11/1977 | Kiyonaga et al. | 428/683 |
| 4,224,360 | 9/1980 | Ohnishi et al. | 428/685 |
| 4,381,940 | 5/1983 | Watanabe et al. | 75/124 |
| 4,400,225 | 8/1983 | Ishikawa et al. | 148/36 |
| 4,484,959 | 11/1984 | Becher et al. | 428/683 |
| 4,609,577 | 9/1986 | Long | 428/683 |

FOREIGN PATENT DOCUMENTS

| | | | |
|---|---|---|---|
| 499944 | 2/1954 | Canada | 428/683 |
| 3416521 | 11/1984 | Fed. Rep. of Germany. | |
| 2258461 | 8/1975 | France. | |
| 1016497 | 1/1966 | United Kingdom. | |
| 1020913 | 2/1966 | United Kingdom. | |
| 1189347 | 4/1970 | United Kingdom. | |

Primary Examiner—John Zimmerman
Attorney, Agent, or Firm—Sughrue, Mion, Zinn, Macpeak & Seas

[57] ABSTRACT

A weld overlaid stainless clad steel for high temperature and high pressure hydrogen service has the improved elevated temperature strength and excellent resistance to hydrogen induced disbonding. The base steel of the clad steel in the invention contains, in weight percent, 0.05% to 0.30% carbon, not more than 1.5% manganese, 0.8% to 5.5% chromium, 0.5% to 1.5% molybdenum and 0.0005% to 0.010% boron, at least one of 0.010% to 0.040% titanium, 0.010% to 0.040% columbium, with the balance of iron and any other incidental impurities.

4 Claims, No Drawings

OVERLAID STAINLESS CLAD STEELS WITH IMPROVED RESISTANCE TO HYDROGEN INDUCED DISBONDING

BACKGROUND OF THE INVENTION

The present invention relates to weld overlaid stainless clad steels as material for pressure vessels which are used for petrochemical, petroleum refining, coal liquefaction industries and other hydrogenation processes where high-temperature and pressure hydrogen is involved.

Hydrogen having high temperatures and pressures has to be handled in main equipments of a petroleum refining process such as desulfurization and hydrocracking reactors. Reactor vessels used for these hydrogenation services are commonly made of low alloy steels for chromium-molybdenum steels, with stainless steels being typically weld overlaid on the inner surface of the vessels in order to protect the low alloy base steels against corrosive environments such as $H_2S$.

In such overlaid stainless clad steels, hydrogen induced disbonding at the interface between the base steel and the cladding is a current material problem, which is accelerated by the increase in the service temperature and hydrogen partial pressures.

It is generally considered that austenitic stainless steels have low sensitivity to hydrogen embrittlement and hence exhibit higher resistance to hydrogen crackings, but, if they are overlaid as claddings on low alloy base steels, hydrogen induced disbonding are much concerned to occur at the interface between the base steel and stainless steel overlaid welds at a shut down condition of the reaction. Two probable reasons for this phenomenon are understood this day as follows: firstly, the weld overlaid austenitic stainless steel forms a different metallic structure near the fusion layer of the welds than when it is used alone, and resulting in coarse grain sizes, and secondly the sensitivity to hydrogen embrittlement increases due to various factors such as carbon migrations from the base metal to the stainless steel during the post weld heat treatments.

With a view to solving those problems, some attempts had been made to improve either the overlay welding materials or the welding conditions but sufficient results are not yet to be obtained.

Nevertheless, with the recent trend to severe service conditions in the hydrogenation processes such as petroleum refining, heavy crude oil cracking and coal liquefaction, there has arisen a strong demand for higher performance base steels and cladding steels with improved resistances against the high temperature and pressure hydrogen environments.

Under these circumstances, the present invention has been accomplished in order to attain the following two objectives regarding with the reliability of reactor vessels used for hydrogenation services:

(1) an improvement in the high-temperature performance of base steel and (2) an improvement in the resistance of the overlay stainless clad steel to the disbonding caused by hydrogen embrittlement.

SUMMARY OF THE INVENTION

The present invention attained these objectives by the following two approaches: firstly, the high-temperature performance of base steel was improved by addition of vanadium, boron, titanium and columbium, secondly, the coarsening of the grain size of austenite in the overlay stainless steel near the fusion layer, which is the major cause of hydrogen induced disbonding, was prevented and, at the same time, the carbon migration from the base steel to the stainless steel which would occur during the post weld heat treatment was also prevented. In order to meet the material requirement of the present invention, as first embodiment of the present invention, a weld overlaid stainless clad steel for high temperature and high pressure hydrogen service with the improved elevated temperature strength and excellent resistance to hydrogen induced disbonding, in which the base steel contains, in weight percent, 0.05% to 0.30% carbon, not more than 1.5% manganese, 0.8% to 5.5% chromium, 0.5% to 1.5% molybdenum and 0.0005% to 0.010% boron, at least one of 0.10% to 0.040% titanium, 0.010% to 0.040% columbium, with the balance being iron and incidental impurities.

As the second embodiment of the present invention, vanadium was intentionally added into the base steel of the first embodiment in an amount of 0.10% to 0.35%.

As the third embodiment of the present invention, a weld overlaid stainless clad steel for high temperature and high pressure hydrogen service with the improved elevated temperature strength and excellent resistance to hydrogen induced disbonding, in which the base steel contains, in weight percent, 0.05% to 0.30% carbon, 0.8% to 5.5% chromium, 0.5% to 1.5% molybdenum and 0.0005% to 0.010% boron, at least one of 0.010% to 0.040% titanium, 0.010% to 0.040% columbium, with the balance being iron and incidental impurities.

As the fourth embodiment of the present invention, vanadium is also intentionally added into the base steel of the third embodiment in an amount of 0.10% to 0.35%.

In the chemical compositions of the third and fourth embodiments of the present invention, manganese is not added in order to avoid a temper embrittlement during long-time higher temperature services and is aimed to be decreased as low as possible. In this case, manganese should be regarded to be an incidental impurity element.

DETAILED DESCRIPTION OF THE PREFERRED EMBODIMENTS

The optimum chemical compositions of the low alloy base metals for weld overlaid clad steels were selected based on following metallurgical investigation.

(a) Carbon

The carbon content should be 0.05 to 0.30 weight percent.

A carbon content of 0.05% or more is required to increase the tensile strength and creep rupture strength, but on the other hand, the increased amount of carbon content reduces the weldability or increases the stress relief cracking susceptibility, and also reduces the creep rupture ductility as well as the impact toughness, and therefore the carbon content was limited to 0.30% maximum.

(b) Manganese

The manganese content should be not more than 1.5 weight percent.

Manganese acts as a deoxidizing element in the same manner as silicon and also improve the hardenability of the steel, but it increases the susceptibility to temper embrittlement. Therefore its maximum content is limited to be 1.5%.

In the case of relatively thin wall pressure vessels, intentional addition of manganese is not required due to the increased hardenability by micro alloying of boron in the steel. Therefore, addition of manganese in the third and fourth embodiments should be avoided because of maintaining good impact toughness after prolonged exposure at the high temperature range where the temper embrittlement markedly arises.

(c) Chromium

The chromium content should be 0.8 to 5.5 weight percent.

Chromium is the element necessary to improve oxidization resistance in steels for high temperature uses, and also acts to improve hardenability and increase creep rupture strength by forming a stable carbide. For these reasons, the content of chromium should be 0.8% or more, but if it exceeds 5.5%, it reduces the amount of solid solution carbon and induces the growth of precipitated carbide, which causes the creep rupture strength to be lowered. Therefore, the most appropriate content of chromium is in the range of 0.8% to 5.5%.

(d) Molybdenum

The molybdenum content should be 0.5 to 1.5 weight percent.

Molybdenum has the effect of solid solution hardening which increases the creep rupture strength, and combines with carbon to form a stable carbide which also increase the creep rupture strength. For these reason, the content of molybdenum should be 0.5% or more. However, its effect in increasing creep rupture strength saturates if its content exceeds 1.5%, and therefore considering also the high price of molybdenum at present time, the content of molybdenum is set to a range of 0.50% to 1.50%.

(e) Vanadium

Vanadium is a strong carbide former which has a greater affinity for the carbon in the steels. During the post weld heat treatment subsequent to the overlay welding, vanadium can act to fix the soluble carbon in the base steel as a stable precipitated carbide of $V_4C_3$, thereby suppressing the migration of carbon from the base metal into the low carbon austenitic stainless steel weld metal.

In order to expect the beneficial effect of vanadium on the resistance to hydrogen induced disbondings, vanadium should be added exceeding 0.10%. However, if the vanadium content is increased over than 0.35%, weldabilities such as stress relief crackings are potentially deteriorated due to secondary hardening by $V_4C_3$ in the vase metals. Therefore, vanadium contents should be controlled in the range of 0.10 to 0.35%.

(f) Boron

Boron in the steels precipitates at the grain boundaries, prevents the formation of the creep void and acts to suppress creep embrittlement. Boron also has the important effect of increasing the hardenability of this low alloy base steel. To achieve these effect of boron, the content of 0.001% or more is necessary. But if it exceeds 0.010%, hot workability of this steels is remarkably reduced. So, the content of boron must be controlled within the range of 0.0005 to 0.010%.

(g) Titanium and Columbium

The titanium and columbium should be 0.010 to 0.040 weight percent, respectively.

In the clad steel of the present invention, both titanium and columbium play to refine the crystal grains of austenitic stainless steel at the fusion layer. The grain size of austenite in the weld overlaid austenitic stainless steel is governed by the process of solidification involving nucleation and grain growth. Titanium and columbium is the base steel form fine precipitations of nitride with high melting point at the fusion layer. The nitrides provide large number of the sites for nucleation when the molten stainless steel solidifies, thereby resulting in fine grain microstructure of austenitic stainless steel nearby the fusion line. The amount necessary to form the interfacial nitrides which are effective for the purpose of refining the crystal grains is at least 0.010% for each of titanium and columbium.

At the same time, titanium and columbium are both a strong oxide and nitride forming elements and if their contents increase, the amount of oxide and nitride as non-metallic inclusion will increase accordingly, thereby reducing the ductility and toughness of the base steel. Hence the upper limits of titanium and columbium should be limited to be 0.040%.

(h) Incidental impurities

Silicon is normally used as a deoxidizer for the steel making practices. However, the base steel of the clad steel in the present invention is deoxidized by a vacuum carbon deoxidization method. As the silicon has a detrimental effect for the vacuum carbon deoxidization practice, the content of silicon as an incidental impurity is preferably held to a minimum level.

In melting in an arc furnace, the Si content is desirably adjusted to 0.1% and below in consideration of engineering tolerance. When manganese is incidental impurity as well as silicon, manganese content should be limited not more than 0.1%. In addition, the contents of other incidental impurities such as P and S excepting the main alloy elements described above are also desirably held to minimum levels.

EXAMPLES

Manufacturing experiences of the clad steel in the present invention are shown in Table 1. A stainless steel (type 347) was overlay welded to those base steels to produce overlay stainless clad steels.

TABLE 1

| | No. | C | Mn | Cr | Mo | V | B | Ti | Nb |
|---|---|---|---|---|---|---|---|---|---|
| Base steel | 1 | 0.13 | 0.51 | 3.11 | 1.04 | — | 0.0031 | 0.023 | — |
| of the clad | 2 | 0.14 | 0.48 | 3.05 | 1.05 | — | 0.0035 | — | 0.027 |
| steel in the | 3 | 0.12 | 0.53 | 2.97 | 1.11 | — | 0.0041 | 0.016 | 0.019 |
| invention | 4 | 0.12 | 0.50 | 3.24 | 1.08 | 0.23 | 0.0028 | 0.024 | — |
| | 5 | 0.14 | 0.47 | 3.03 | 1.06 | 0.25 | 0.0042 | — | 0.025 |

TABLE 1-continued

|  | No. | C | Mn | Cr | Mo | V | B | Ti | Nb |
|---|---|---|---|---|---|---|---|---|---|
|  | 6 | 0.15 | 0.55 | 3.08 | 0.97 | 0.22 | 0.0036 | 0.013 | 0.017 |
|  | 7 | 0.17 | 0.03 | 3.23 | 1.15 | — | 0.0051 | 0.026 | — |
|  | 8 | 0.18 | 0.05 | 3.14 | 1.12 | — | 0.0048 | — | 0.025 |
|  | 9 | 0.18 | 0.03 | 3.02 | 1.14 | — | 0.0045 | 0.022 | 0.023 |
|  | 10 | 0.19 | 0.04 | 3.17 | 1.12 | 0.27 | 0.0053 | 0.021 | — |
|  | 11 | 0.18 | 0.06 | 3.10 | 1.10 | 0.27 | 0.0057 | — | 0.028 |
|  | 12 | 0.17 | 0.05 | 3.06 | 1.09 | 0.24 | 0.0059 | 0.024 | 0.024 |
| Comparison | 13 | 0.14 | 0.51 | 3.01 | 1.01 | — | — | — | — |
|  | 14 | 0.16 | 0.53 | 3.14 | 0.99 | 0.20 | — | — | — |
|  | 15 | 0.18 | 0.05 | 3.10 | 1.12 | — | — | — | — |
|  | 16 | 0.18 | 0.04 | 3.16 | 1.14 | 0.23 | — | — | — |

The results of a tensile and creep rupture test conducted on the base steels shown in Table 1 are summarized in Table 2. As is clear from Table 2, the base steels of clad steels prepared in accordance with the present invention were little different from the comparative samples in terms of strength and ductility at room temperature but the former were far better in terms of creep rupture strength at elevated temperature.

A type 347 stainless steel was overlay welded to each of the base steels of Table 1. Thereafter, the clad steels were subjected to a post-heat treatment at 690° C. for 26 h and each of them was machined to test pieces including the cladding overlay with the dimension of 55 mm thick, 50 mm wide and 110 mm long. Those test pieces were subjected to disbonding test in an autoclave under the following procedures: they were exposed to a hydrogen atmosphere with the temperatures of 375°–575° C. and the pressure of 150 kg/cm², then, after cooling in air, the test pieces were left in air atmosphere at room temperature for a given period to check for the presence of any disbond using ultrasonic inspections. The test results are summarized in Table 3.

TABLE 2

|  | No. | Tensile strength kg/mm² | 0.2 offset yield strength kg/mm² | Elongation % | Reduction of area % | Creep rupture strength at 500° C. 3,000 hr kg/mm² |
|---|---|---|---|---|---|---|
| Base steel of the clad steel in the invention | 1 | 64.6 | 54.1 | 25.8 | 78.7 | 30.6 |
|  | 2 | 65.5 | 54.8 | 26.1 | 77.6 | 31.1 |
|  | 3 | 63.8 | 53.2 | 25.2 | 79.1 | 31.3 |
|  | 4 | 64.0 | 54.4 | 25.6 | 79.4 | 32.6 |
|  | 5 | 65.1 | 55.1 | 26.3 | 78.2 | 32.2 |
|  | 6 | 65.2 | 55.3 | 25.1 | 77.5 | 32.9 |
|  | 7 | 63.4 | 53.7 | 27.1 | 79.6 | 30.1 |
|  | 8 | 64.2 | 53.4 | 27.7 | 80.1 | 30.3 |
|  | 9 | 65.2 | 54.1 | 26.8 | 79.9 | 30.6 |
|  | 10 | 64.4 | 53.3 | 27.3 | 80.5 | 31.2 |
|  | 11 | 63.1 | 53.6 | 28.1 | 81.3 | 31.4 |
|  | 12 | 64.7 | 54.5 | 26.9 | 79.4 | 31.6 |
| Comparison | 13 | 60.5 | 50.2 | 26.8 | 76.4 | 21.3 |
|  | 14 | 61.2 | 51.4 | 25.5 | 75.2 | 22.5 |
|  | 15 | 59.8 | 49.6 | 27.4 | 80.1 | 20.7 |
|  | 16 | 60.3 | 50.3 | 27.1 | 78.4 | 21.2 |

TABLE 3

|  | No. | Test temperature for hydrogen induced disbonding (C.°) | | | | | | | | |
|---|---|---|---|---|---|---|---|---|---|---|
|  |  | 375 | 400 | 425 | 450 | 475 | 500 | 525 | 550 | 575 |
| The clad steel of the invention | 1 |  |  | ○ | ○ | ○ | ○ | ○ | ○ | ○ |
|  | 2 |  |  | ○ | ○ | ○ | ○ | ○ | ○ | ○ |
|  | 3 |  |  | ○ | ○ | ○ | ○ | ○ | ○ | ○ |
|  | 4 |  |  | ○ | ○ | ○ | ○ | ○ | ○ | ○ |
|  | 5 |  |  | ○ | ○ | ○ | ○ | ○ | ○ | ○ |
|  | 6 |  |  | ○ | ○ | ○ | ○ | ○ | ○ | ○ |
|  | 7 |  |  | ○ | ○ | ○ | ○ | ○ | ○ | ○ |
|  | 8 |  |  | ○ | ○ | ○ | ○ | ○ | ○ | ○ |
|  | 9 |  |  | ○ | ○ | ○ | ○ | ○ | ○ | ○ |
|  | 10 |  |  | ○ | ○ | ○ | ○ | ○ | ○ | ○ |
|  | 11 |  |  | ○ | ○ | ○ | ○ | ○ | ○ | ○ |
|  | 12 |  |  | ○ | ○ | ○ | ○ | ○ | ○ | ○ |
| Comparison | 13 | ○ | ◉ | ○ | ◐ | ● | ● | ● | ● | ● |
|  | 14 | ○ | ○ | ○ | ◐ | ○ | ◐ | ● | ● | ● |
|  | 15 | ○ | ○ | ○ | ◐ | ● | ● | ● | ● | ● |
|  | 16 | ○ | ○ | ○ | ○ | ○ | ◐ | ● | ● | ● |

Note:
○ No disbonding
◐ Slight disbonding
● Extensive disbonding

As shown in Table 3, the clad steels in the present invention did not exhibit any disbonding up to the maximum test temperature of 575° C. On the other hand, comparative samples Nos. 13 and 15 experienced the hydrogen induced disbonding at a test temperature of 450° C. and comparative samples Nos. 14 and 16 at a test temperature of 500° C.

The example described above refers to the results of a hydrogen induced disbonding only for stainless clad steel overlaid with type 347 stainless steel.

However it should be noted that same conferment tests were conducted on other combinations of austenitic stainless steels such as type 316, 309 and 321 and demonstrated the satisfactory test results for each clad steel with the invented base steels.

In accordance with the present invention, four embodiments of overlay stainless clad steels could be obtained which were characterized by the excellent high-temperature performance of the base steel and improved resistance to hydrogen induced disbondings.

We claim:

1. A weld overlaid stainless clad steel for high temperature and high pressure hydrogen service with the improved elevated temperature strength and excellent resistance to hydrogen induced disbonding, in which the base steel contains, in weight percent, 0.05% to 0.30% carbon, not more than 1.5% manganese, 0.8% to 5.5% chromium, 0.5% to 1.5% molybdenum, 0.0005% to 0.010 % boron, at least one of 0.010 % to 0.040% titanium, 0.010% to 0.040% columbium, with the balance of iron and any other incidental impurities.

2. A weld overlaid stainless clad steel for high temperature and high pressure hydrogen service with the improved elevated temperature strength and excellent resistance to hydrogen induced disbonding, in which the base steel contains, in weight percent 0.05% to 0.30% carbon, not more than 1.5% manganese, 0.8% to 5.5% chromium, 0.5% to 1.5% molybdenum, 0.10% to 0.35% vanadium, 0.0005% to 0.010% boron, at least one of 0.010% to 0.040% titanium, 0.010% to 0.040% columbium, with the balance being iron and any other incidental impurities.

3. A weld overlaid stainless clad steel for high temperature and high pressure hydrogen service with the improved elevated temperature strength and excellent resistance to hydrogen induced disbonding, in which the base steel contains in weight percent, 0.05% to 0.30% carbon, 0.8% to 5.5% chromium, 0.5% to 1.5% molybdenum, 0.0005% to 0.010% boron, at least one of 0.010% to 0 040% titanium, 0.010% to 0.040% columbium, with the balance being iron and any other incidental impurities.

4. A weld overlaid stainless clad steel for high temperature and high pressure hydrogen service with the improved elevated temperature strength and excellent resistance to hydrogen induced disbonding, in which the base steel contains, in weight percent, 0.05% to 0.30% carbon, 0.8% to 5.5% chromium, 0.5% to 1.5% molybdenum, 0.10% to 0.35% vanadium, 0.0005% to 0.010% boron, at least one of 0.010% to 0.040% titanium, 0.010% to 0.040% columbium, with the balance being iron and any other incidental impurities.

* * * * *